(12) United States Patent
Chun et al.

(10) Patent No.: US 8,087,081 B1
(45) Date of Patent: Dec. 27, 2011

(54) SELECTION OF REMOTELY LOCATED SERVERS FOR COMPUTER SECURITY OPERATIONS

(75) Inventors: Lou Ju Chun, Taipei (TW); Chia-Wen Chan, Taipei (TW); Sam Lin, Taipei (TW); Jay Wang, Taipei (TW); Chih-Kang Lu, Taipei (TW); Sean Yen, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 682 days.

(21) Appl. No.: 12/265,598

(22) Filed: Nov. 5, 2008

(51) Int. Cl.
*G06F 12/14* (2006.01)

(52) U.S. Cl. .............. 726/22; 726/23; 726/24; 726/25; 726/26

(58) Field of Classification Search ............. 726/22–26
See application file for complete search history.

(56) References Cited

U.S. PATENT DOCUMENTS

| | | | |
|---|---|---|---|
| 5,623,600 A | 4/1997 | Ji et al. | |
| 6,021,510 A | 2/2000 | Nachenberg | |
| 6,094,731 A | 7/2000 | Waldin et al. | |
| 6,195,587 B1 | 2/2001 | Hruska et al. | |
| 6,745,192 B1 | 6/2004 | Libenzi | |
| 6,748,538 B1 | 6/2004 | Chan et al. | |
| 6,847,995 B1 | 1/2005 | Hubbard et al. | |
| 6,938,097 B1 | 8/2005 | Vincent et al. | |
| 7,010,807 B1 | 3/2006 | Yanovsky et al. | |
| 7,096,493 B1 | 8/2006 | Liu | |
| 7,099,853 B1 | 8/2006 | Liu et al. | |
| 7,143,113 B2 | 11/2006 | Radatti | |
| 7,185,015 B2 | 2/2007 | Kester et al. | |
| 7,203,959 B2 | 4/2007 | Nachenberg et al. | |
| 7,299,277 B1 | 11/2007 | Moran et al. | |
| 7,328,349 B2 | 2/2008 | Milliken | |
| 7,337,471 B2 | 2/2008 | Nachenberg et al. | |
| 7,373,643 B2 | 5/2008 | Radatti | |
| 7,406,454 B1 | 7/2008 | Liu et al. | |
| 2004/0193907 A1* | 9/2004 | Patanella | 713/200 |
| 2005/0273850 A1* | 12/2005 | Freund | 726/14 |
| 2007/0101146 A1 | 5/2007 | Louch et al. | |
| 2007/0150948 A1 | 6/2007 | De Spiegeller | |
| 2007/0162463 A1 | 7/2007 | Kester et al. | |
| 2007/0174909 A1 | 7/2007 | Burchett et al. | |
| 2007/0234343 A1 | 10/2007 | Gouge et al. | |

(Continued)

OTHER PUBLICATIONS

Binary diff/patch utility, 1 sheet [retrieved on May 30, 2008]. Retrieved from the internet: http://www.daemonology.net/bsdiff/, 2003.

Summary Cache: A Scalable Wide-Area Web Cache Sharing Protocol, 2 sheets [retrieved on May 21, 2008]. Retrieved from the internet: http://pages.cs.wisc.edu/~cao/papers/summary-cache/share.html.

(Continued)

*Primary Examiner* — Krisna Lim
(74) *Attorney, Agent, or Firm* — Okamoto & Benedicto LLP

(57) ABSTRACT

A client computer may be configured to perform computer security operation services, such as malicious code scanning and protection against online threats, using one of several remotely located server computers. The client computer may be configured to determine an operational state of the server computers and determine a protection status of the client computer resulting from use of a server computer of a particular operational state. The protection status may have one of at least three levels and indicate vulnerability of the client computer. The client computer may determine the operational state of a server computer based on available bandwidth for network communication between the client computer and the server computer. The client computer may be configured to allow for automatic or manual selection of another server computer when the currently selected server computer results in the client computer having a protection status below a threshold level.

20 Claims, 8 Drawing Sheets

U.S. PATENT DOCUMENTS

| | | | |
|---|---|---|---|
| 2007/0240218 A1 | 10/2007 | Tuvell et al. | |
| 2007/0244920 A1 | 10/2007 | Palliyil et al. | |
| 2008/0022397 A1* | 1/2008 | Cheng .............................. | 726/20 |
| 2008/0033942 A1 | 2/2008 | Kao et al. | |
| 2008/0077971 A1* | 3/2008 | Wright et al. ..................... | 726/1 |
| 2008/0092235 A1 | 4/2008 | Comlekoglu et al. | |
| 2008/0095065 A1 | 4/2008 | Albrecht | |
| 2009/0235359 A1* | 9/2009 | Abdulhayoglu et al. ....... | 726/25 |
| 2009/0249489 A1* | 10/2009 | Livshits et al. ................. | 726/26 |

OTHER PUBLICATIONS

Bloom Filters—the math, 6 sheets [retrieved on May 22, 2008]. Retrieved from the internet: http://pages.cs.wisc.edu/~cao/papers/summary-cache/node8.html.

Bloom Filter—Wikipedia, the free encyclopedia, 7 sheets [retrieved on May 21, 2008]. Retrieved from the internet: http://en.wikipedia.org/wiki/Bloom_filter.

John Wack, et. al., "Guide to Firewall Selection and Policy Recommendations", Oct. 2001, 64 pages, National Institute of Standards and Technology (NIST) special publication.

Microsoft TechNet "Unsolicited Commercial E-Mail Prevention and Filtering Performance Analysis", Jan. 1999, pp. 1-14, retrieved from the internet: http://www.microsoft.com/technet/archive/mcis/rkspmcpa.mspx?pf=true.

Martin Roesch, "Snort—Lightweight Intrusion Detection for Networks", 1999, pp. 229-238 of the 13th LISA Conference proceedings. Retrieved from the internet: http://www.usenix.org/events/lisa99/full_papers/roesch/roesch_html/.

* cited by examiner

| | | |
|---|---|---|
| LocationProfileGatewayIP000 | REG_SZ | 10.1.107.254 |
| LocationProfileGatewayIP001 | REG_SZ | 10.1.143.254 |
| LocationProfileGatewayIP002 | REG_SZ | 10.1.139.254 |
| LocationProfileGatewayIP003 | REG_SZ | 10.1.135.254 |
| LocationProfileGatewayIP004 | REG_SZ | 10.1.131.254 |
| LocationProfileGatewayIP005 | REG_SZ | 10.1.127.254 |
| LocationProfileGatewayIP006 | REG_SZ | 10.1.123.254 |
| LocationProfileGatewayIP007 | REG_SZ | 10.1.111.254 |
| LocationProfileGatewayIP008 | REG_SZ | 10.1.147.254 |
| LocationProfileGatewayIP009 | REG_SZ | 10.1.115.254 |
| LocationProfileGatewayIP010 | REG_SZ | 10.1.119.254 |
| LocationProfileGatewayIP011 | REG_SZ | 10.1.151.254 |
| LocationProfileGatewayIP012 | REG_SZ | 10.1.155.254 |
| LocationProfileGatewayIP013 | REG_SZ | 10.1.247.254 |
| LocationProfileGatewayIP014 | REG_SZ | 10.1.103.254 |
| LocationProfileGatewayIP015 | REG_SZ | 10.1.159.254 |
| LocationProfileGatewayIP016 | REG_SZ | 10.1.163.254 |

FIG. 4

SELECTION OF REMOTELY LOCATED SERVERS FOR COMPUTER SECURITY OPERATIONS

BACKGROUND OF THE INVENTION

1. Field of the Invention

The present invention relates generally to computer security, and more particularly but not exclusively to methods and apparatus for performing computer security operations using remote services.

2. Description of the Background Art

Generally speaking, computer security operations involve protection of computers and user information against malicious codes and online threats. Malicious codes may include computer viruses, trojans, spywares, worms, rootkits, and the like.

Online threats may include malicious websites, network intrusion, denial of service attacks, pharming, phishing, spam, eavesdropping, and various online fraudulent schemes. Traditional computer security products may include a client-based scan engine and a pattern file that is periodically updated to keep it current. Both the scan engine and the pattern file are on a customer client or server computer. For example, the scan engine may be configured for virus scanning and the pattern file may comprise a database of signatures of known viruses. The scan engine and the pattern file may be used in conjunction with a pattern-matching algorithm to scan a file for computer viruses. The pattern file is continually updated to keep up with newly discovered viruses, increasing the size of the pattern file and the processing requirements of the scan engine.

SUMMARY

In one embodiment, a client computer is configured to perform computer security operation services, such as malicious code scanning and protection against online threats, using one of a plurality of server computers. The client computer may be configured to determine an operational state of the server computers and determine a protection status of the client computer resulting from use of a server computer of a particular operational state. The protection status may have one of at least three levels and indicate vulnerability of the client computer. The client computer may determine the operational state of a server computer based on available bandwidth for network communication between the client computer and the server computer. The client computer may be configured to allow for automatic or manual selection of another server computer when the currently selected server computer results in the client computer having a protection status below a threshold level.

These and other features of the present invention will be readily apparent to persons of ordinary skill in the art upon reading the entirety of this disclosure, which includes the accompanying drawings and claims.

DESCRIPTION OF THE DRAWINGS

FIG. 4 shows an example listing of security server computers.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
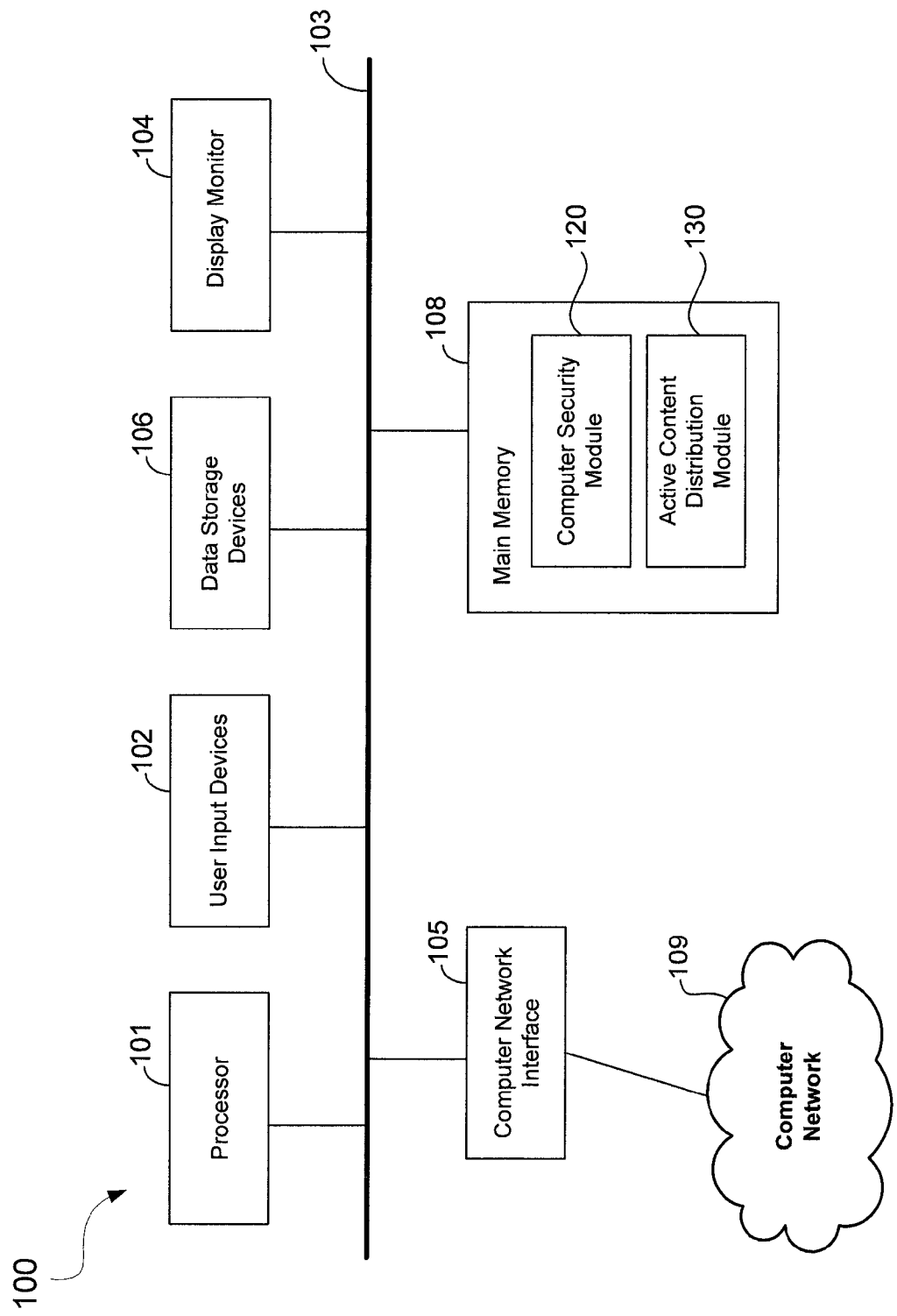
FIG. 1 shows a schematic diagram of a client computer in accordance with an embodiment of the present invention.

Referring now to FIG. 1, there is shown a schematic diagram of a client computer 100 in accordance with an embodiment of the present invention. The client computer 100 may have less or more components to meet the needs of a particular application. The client computer 100 may include a processor 101, such as those from the Intel Corporation or Advanced Micro Devices, for example. The client computer 100 may have one or more buses 103 coupling its various components. The client computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 comprises software components of the client computer 100, which includes a computer security module 120 and an active content distribution module 130. The software components of the client computer 100 may be loaded from the data storage device 106 to the main memory 108 for execution by the processor 101.

The computer security module 120 may comprise computer-readable program code for performing computer security operations in the client computer 100, which may include securing the client computer 100 against malicious codes and online security threats. In one embodiment, the computer security module 120 performs antivirus functions in the client computer 100 using remote scanning services. It is to be noted that the computer security module 120 may also perform other computer security operations in the client computer without detracting from the merits of the present invention. For example, the computer security module 120 may be configured to perform anti-spam, malicious website detection, etc. using remotely located server computers.

Figure 2:
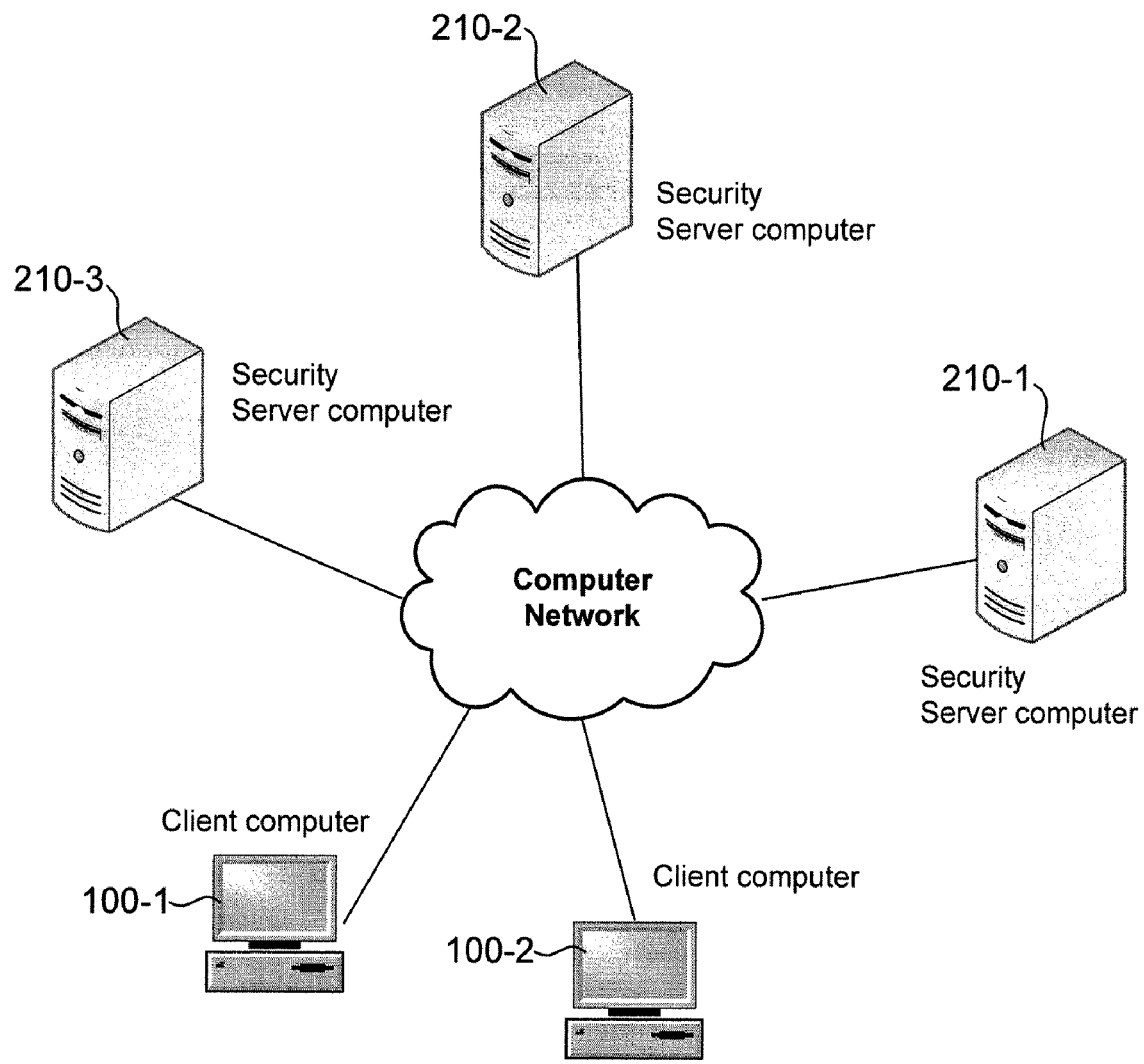
FIG. 2 schematically shows a computing environment in accordance with an embodiment of the present invention.

In one embodiment, the computer security module 120 is configured to determine if a file or other data unit comprises malicious codes by requesting a virus scan service from one of many remotely located security server computers 210 (see FIG. 2). The computer security module 120 may be configured to forward the file to be scanned to a selected security server computer 210 by way of the distribution module 130. The security server computer 210 may scan the file for malicious codes and provide the result of the scanning to the client computer 100. The scanning result may indicate whether or not the file contains malicious codes. The security server computer 210 and the client computer 100 may communicate over the computer network 109.

In general, the computer security module 120 may be configured to perform a computer security operation by sending target computer data (e.g., file, e-mail, IP address, domain name, etc.) to a remotely located security server computer 210, where the target data is processed depending on the computer security operation. For example, if the security operation is anti-spam, the target data may comprise e-mail analyzed by the security server computer 210 for spam content. As another example, if the computer security operation is detection of malicious websites, the target data may comprise an IP address or domain name that is compared by the security server computer 210 to IP addresses and domain names of known malicious websites. The security server computer 210 provides the result of target data processing to the client computer 100.

The active content distribution module 130 may comprise computer-readable program code for selecting one of many security server computers 210 from which to receive computer security services. The distribution module 130 may be configured to receive the target data from the computer security module 120, forward the target data to the selected security server computer 210 where the target data is processed, receive the result of target data processing from the selected security server computer, and provide the result of target data processing to the computer security module 120.

The distribution module 130 may be configured to determine the operational state of the currently selected security server computer 210 and determine the protection status of the client computer 100 based on the operational state of the selected security server computer 210. The operational state of a security server computer 210 is indicative of the capability of the security server computer 210 to provide computer security operation service to the client computer 100. The protection status of the client computer 100 indicates the vulnerability of the client computer 100 to malicious codes and/or online threats. A security server computer 210 may have one of several operational states, with each operational state indicating the reliability of the security server computer 210 to provide the remote computer security operation service. The distribution module 130 may determine the operational state of a security server computer 210 based on service latency, i.e., the time between sending target data to the security server computer 210 and receiving result of the target data processing from the security server computer 210.

In the embodiment where the computer security module 120 is configured to perform antivirus operations in the client computer 100, the distribution module 130 is configured to receive a file to be scanned for malicious codes from the computer security module 120. The distribution module 130 determines the operational state of security server computers 210 assigned to provide remote scanning services to the client computer 100. The distribution module 130 may determine the scanning latency of each of the security server computers 210, i.e., the time it takes to send the file to a security server computer 210 and receive a result of the file scanning. The distribution module 130 may be configured to automatically select or allow a user to manually select a security server computer 210 based on the security server computer's 210 operational state, which preferably is the one that provides the highest level of protection status to the client computer 100. The distribution module 130 may be configured to automatically select or allow a user to manually select a security server computer 210 whenever the currently selected security server computer 210 results in the protection status of the client computer 100 not meeting a minimum protection status level. The distribution module 130 may forward the file to be scanned to the selected security server computer 210.

FIG. 2 schematically shows a computing environment in accordance with an embodiment of the present invention. In the example of FIG. 2, the computing environment includes a plurality of remotely located security server computers 210 (i.e., 210-1, 210-2, and 210-3) and client computers 100 (i.e., 100-1 and 100-2). There may be more or less security server computers 210 and client computers 100 depending on the application. The security server computers 210 and the client computers 100 may communicate over a computer network.

Figure 3:
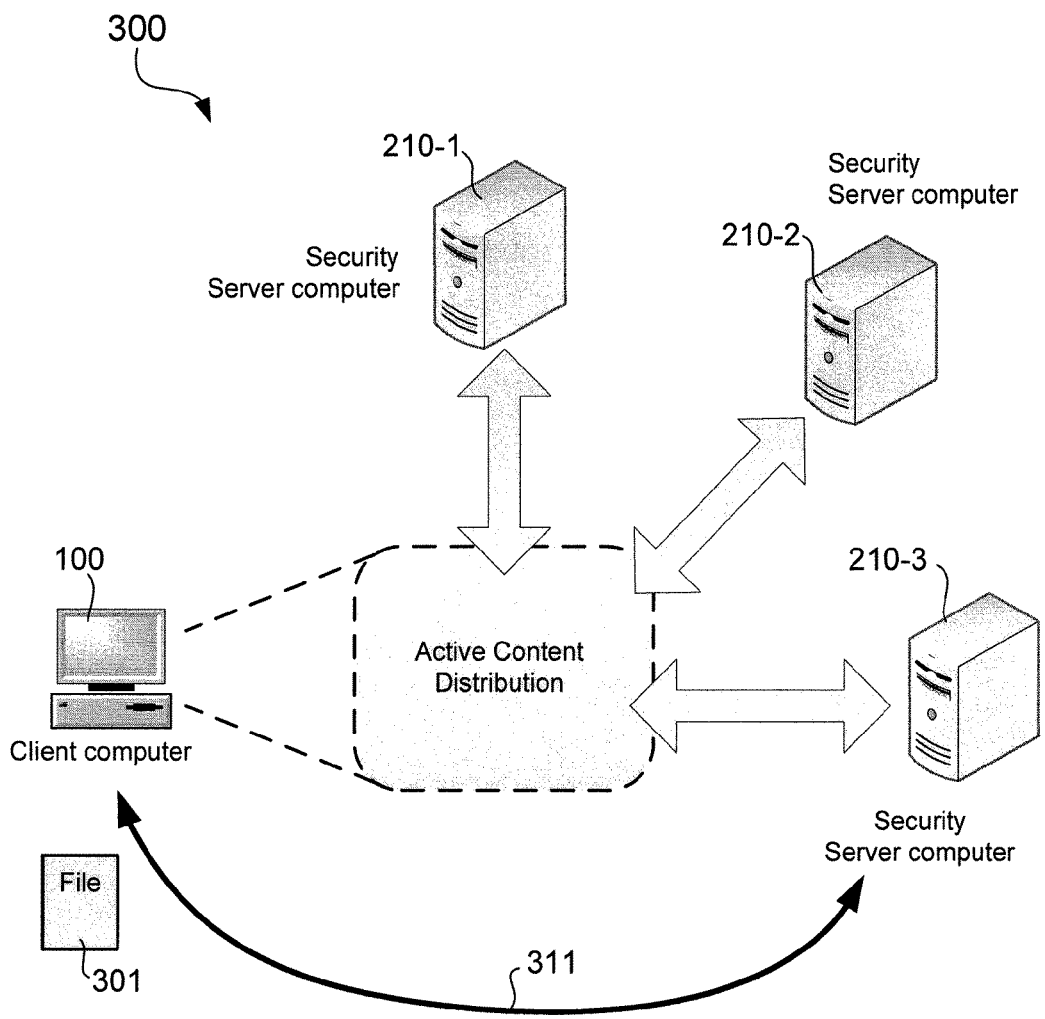
FIG. 3 schematically illustrates sending of target data from a client computer to one of several security server computers in accordance with an embodiment of the present invention.

The security server computers 210 may be configured to provide remote computer security operations services to the client computers 100. The distribution module 130 may be configured to have access to a listing of the security server computers 210, including their IP (Internet Protocol) addresses as shown in FIG. 4. In the example of FIG. 4, each row represents the name and IP address of a security server computer 210. The distribution module 130 may select one of the security server computers 210 to provide remote computer security operation to the client computer 100. This is schematically illustrated in FIG. 3, where the client computer 100 may send target data to one of several security server computers 210 for processing. In the example of FIG. 3, the client computer 100 may send a file 301 to one of the security server computers 210-1, 210-2, and 210-3 for scanning for malicious codes. The selected security server computer 210, which is 210-3 in this example, receives and scans the file 301 for malicious codes (arrow 311), e.g., by pattern matching, and then provides the result of the scanning to the client computer 100.

The service latency or time between sending of a request and receiving a response may be expressed in mathematical form as:

$$\text{Latency} = \frac{O}{BA} + 2RTT + \sum_{k=1}^{n}\left(RTT + \frac{S}{BA} - \frac{S}{BA}2^{k-1}\right)^+ \qquad \text{EQ. 1}$$

where O is the size of all of the packets combined for the latency measurement, BA is the available bandwidth for network communication between the client computer 100 and a security server computer 210, n is the sending times (e.g., when sending five HTTP transactions, n is equal to 5), S is the size of a single packet, and RTT is the network round trip time.

Because, $$\sum_{k=1}^{n} 2^{k-1} = 2^n - 1 \qquad \text{EQ. 2}$$

EQ. 1 can be rewritten as, $$\text{Latency} = \frac{O}{BA} + 2RTT + n\left(RTT + \frac{S}{BA}\right) - (2^n - 1)\frac{S}{BA} \qquad \text{EQ. 3}$$

RTT is typically very small and can be removed from EQ. 3, $$\text{Latency} = \frac{O}{BA} + RTT + n\left(RTT + \frac{S}{BA}\right) - (2^n - 1)\frac{S}{BA} \qquad \text{EQ. 4}$$

EQ. 4 can be rearranged to determine available bandwidth BA, $$BA = \frac{O + n*S - (2^n - 1)*S}{\text{Latency} - RTT - (n*RTT)} \qquad \text{EQ. 5}$$

The distribution module 130 may use EQ. 5 to calculate the available bandwidth for network communication between the client computer 100 and a security server computer 210. The distribution module 130 may use the available bandwidth as an indicator of the operational state of a security server computer 210. For example, a low available bandwidth indicates that the security server computer 210 is in a degraded operational state, which may compromise security operations because of long latency. In particular, if the available bandwidth is low, it may take some time before the security server computer 210 can provide result (if ever) of scanning a file for malicious code. On the other hand, if the available bandwidth is high, the security server computer 210 is in excellent operational state, and thus can provide short service latency. This allows for relatively fast scanning of files of the client computer 100, for example.

As can be appreciated, the operational state of the security server computer 210 may be affected by various factors including the amount of network traffic on the network used by the security server computer 210 and the client computer 100 to communicate, the condition of the network, the loading on the security server computer 210, the condition of the security server computer 210, and so forth.

The distribution module 130 may assign protection status on the client computer 100 based on the operational state of the selected security server computer 210. In the case where available bandwidth represents the operational state of the security server computer 210, the distribution module 130 may assign protection status based on available bandwidth BA. For example, the distribution module 130 may assign protection status as follows:

If BA>threshold_1, then protection status is good

If threashold_2<BA<threshold_1, then protection status is normal

If BA<threshold_3, then protection status is poor where threshold_1, threshold_2, and threshold_3 are communication bandwidth thresholds in decreasing order. More specifically, if the available bandwidth to a selected security server computer 210 is greater than threshold_1, then the protection status of the client computer 100 is "good." This is because the available bandwidth is such that the client computer 100 can receive result from the security server computer 210 in time. Similarly, the protection status of the client computer 100 is "normal" if the available bandwidth to the selected security server computer 210 is between threshold_2 and threshold_1. The distribution module 130 may deem the protection status of the client computer 100 to be "poor" when the available bandwidth to the selected security server computer 210 is below the threshold_3. When the available bandwidth is below the threshold_3, the selected security server computer 210 may take some time, or worse never be able, to provide result. This makes the client computer 100 vulnerable to malicious codes and online threats.

Preferably, there are at least three possible levels of protection where the available bandwidth is still useable, and another level of protection where the security server computer is offline (i.e., the user must change service). Four possible levels of protection may indicate whether the service is fast (e.g., network process time<=I/O process time of the original process), medium (e.g., 500 ms time out>network process time>I/O process time), slow (e.g., network process time>500 ms; advice user to change service), and offline (e.g., network process time>500 ms for at least four instances; user must change service.).

Figure 5:
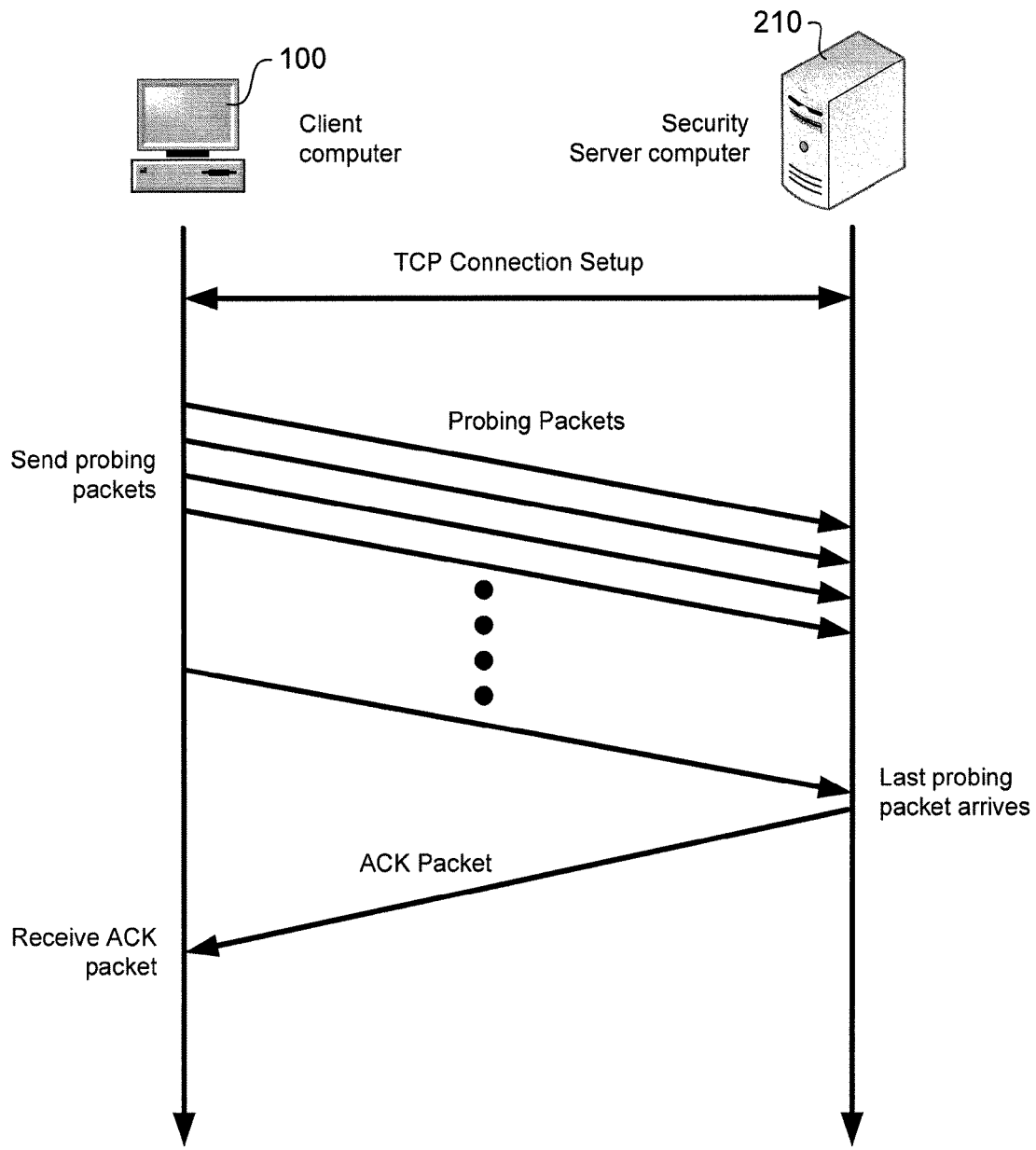
FIG. 5 shows a call diagram illustrating determination of available bandwidth for network communication between a client computer and a security server computer in accordance with an embodiment of the present invention.

FIG. 5 shows a call diagram illustrating determination of available bandwidth for network communication between a client computer 100 and a security server computer 210 in accordance with an embodiment of the present invention. The steps performed by the client computer 100 may be performed by the distribution module 130. In the example of FIG. 5, the client computer 100 and the security server computer 210 performs TCP (transport control protocol) connection setup to create a communications channel between them. The client computer 110 sends probing packets to the security server computer 210. The probing packets may contain information indicating the number of probing packets that the security server computer 210 should expect to receive. Once the last probing packet is received by the security server computer 210, the security server computer 210 sends an acknowledgement packet to the client computer 210. The acknowledgement packet indicates to the client computer 210 that the security server computer 210 has received the probing packets. More importantly, the client computer 100 may initiate calculation of available bandwidth between the client computer 100 and the security server computer 210 based on the elapsed time from sending the first probing packet to the security server computer 210 to receiving the acknowledgement packet in the client computer 100.

Figure 6:
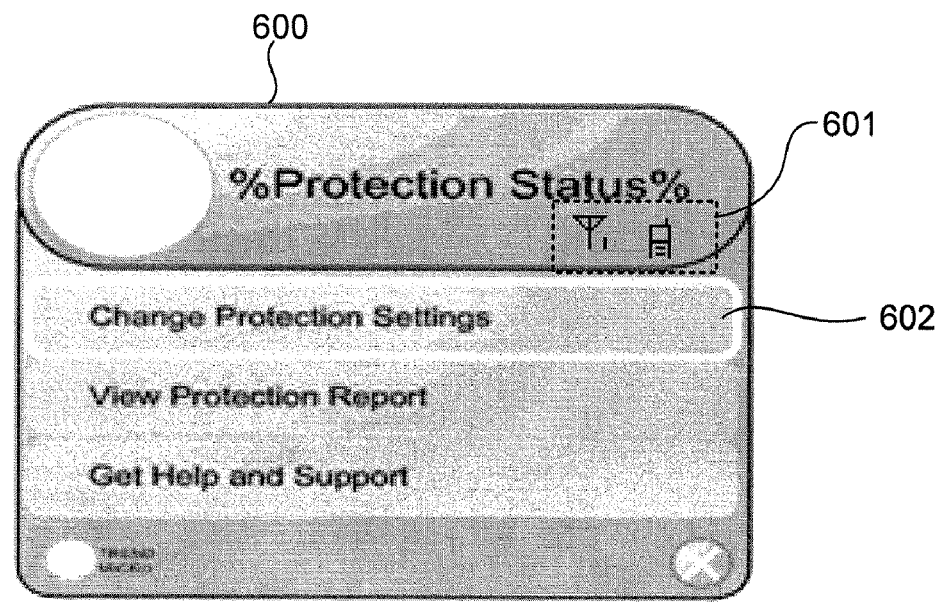
FIG. 6 shows a user interface in accordance with an embodiment of the present invention.

FIG. 6 shows a user interface 600 in accordance with an embodiment of the present invention. In the example of FIG. 6, the user interface 600 includes a message indicating the protection status of the client computer. The distribution module 130 may be configured to automatically display (e.g., as a pop-up display) the user interface 600 on the display monitor of the client computer 100 when the protection status of the client computer 100 goes below a minimum protection level. The user interface 600 may also be manually invoked by the user, for example.

Figure 7:
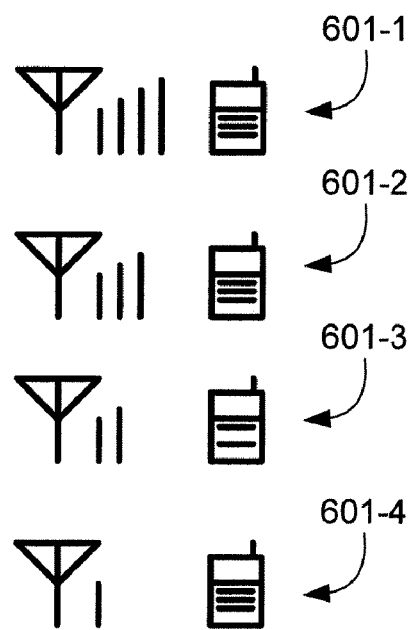
FIG. 7 shows example indicators that may be displayed on the user interface of FIG. 6 in accordance with an embodiment of the present invention.

In the example of FIG. 6, the user interface 600 includes an indicator 601 indicating the protection status of the client computer 100. The indicator 601 may vary depending on the protection status of the client computer 100. FIG. 7 shows example indicators 601 (i.e., 601-1, 601-2, 601-3, and 601-4) that may be displayed on the user interface 600 in accordance with an embodiment of the present invention. Indicators 601-1 to 601-4 indicate one of four possible protection status levels in decreasing order, with indicator 601-1 indicating the highest protection status level and the indicator 601-4 indicating the lowest protection status level. The indicators 601 are shown as graphical icons of cellular phone signal strengths to provide the user with a familiar indicator. However, this does not necessarily mean that the connection between the client computer 100 and the security server computer 210 is cellular.

In the example of FIG. 6, the user interface 600 may also include a user interface component that may be activated in the form of a button 602. Activation (e.g., clicking with a mouse or other pointing device) of the button 602 may allow the user to manually change the protection settings. In one embodiment, activation of the button 602 displays to the user a listing of available security server computers 210 and protection status resulting from selection of the listed security server computers 210. The user may manually select a security server computer 210, which typically is the one that results in highest protections status, from the listing. The contents of such a listing is graphically shown in FIG. 8.

Figure 8:
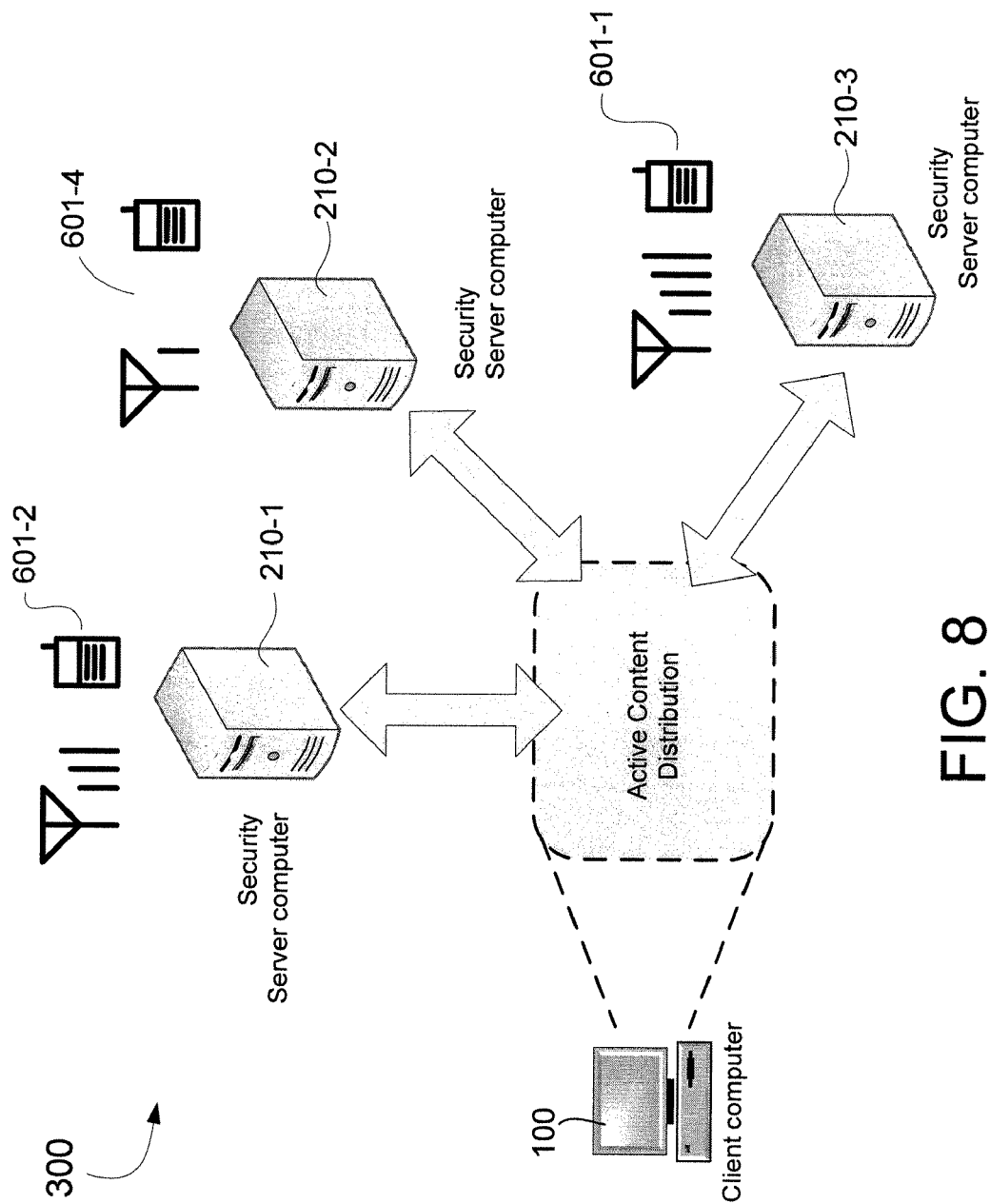
FIG. 8 shows the security server computers of FIG. 3 with corresponding indicators 601.

FIG. 8 shows the security server computers 210 with corresponding indicators 601. In the example of FIG. 8, selecting the security server computer 210-1 will result in the indicator 601-2 being displayed on the user interface 600, selecting the security server computer 210-2 will result in the indicator 601-4 being displayed on the user interface 600, and selecting the security server computer 210-3 will result in the indicator 601-1 being displayed on the user interface 600. In the example of FIG. 8, the security server computer 210-3 provides the highest level of protection status to the client computer 100. Accordingly, in the example of FIG. 8, the security server computer 210-3 may be automatically selected by the distribution module 130 or manually selected by the user in a listing displaying the security server computers 210-1, 210-2, and 210-3.

Although use of remote computer security operation services has many advantages, including reduced processing and storage requirements in the client computer, it is not without associated problem. More specifically, the client computer 100 becomes unprotected or more vulnerable to attacks when the security server computer 210 providing the computer security operation becomes unavailable or provides degraded service. Embodiments of the present invention address that problem by determining protection status of the client computer 100 arising from use of a particular security server computer 210. Embodiments of the present invention thus advantageously allow for replacement, either automatically or manually, of a degraded or degrading security server computer 210 before it totally stops providing service. In contrast to simply providing an indication on whether or not a security server computer 210 is online, embodiments of the present invention provide different levels of protection status (e.g., at least three different levels), facilitating selection of the best security server computer 210 to use, providing advance warning of degrading protection status, and providing information as to other security server computers 210 that result in better protection status.

Figure 9:
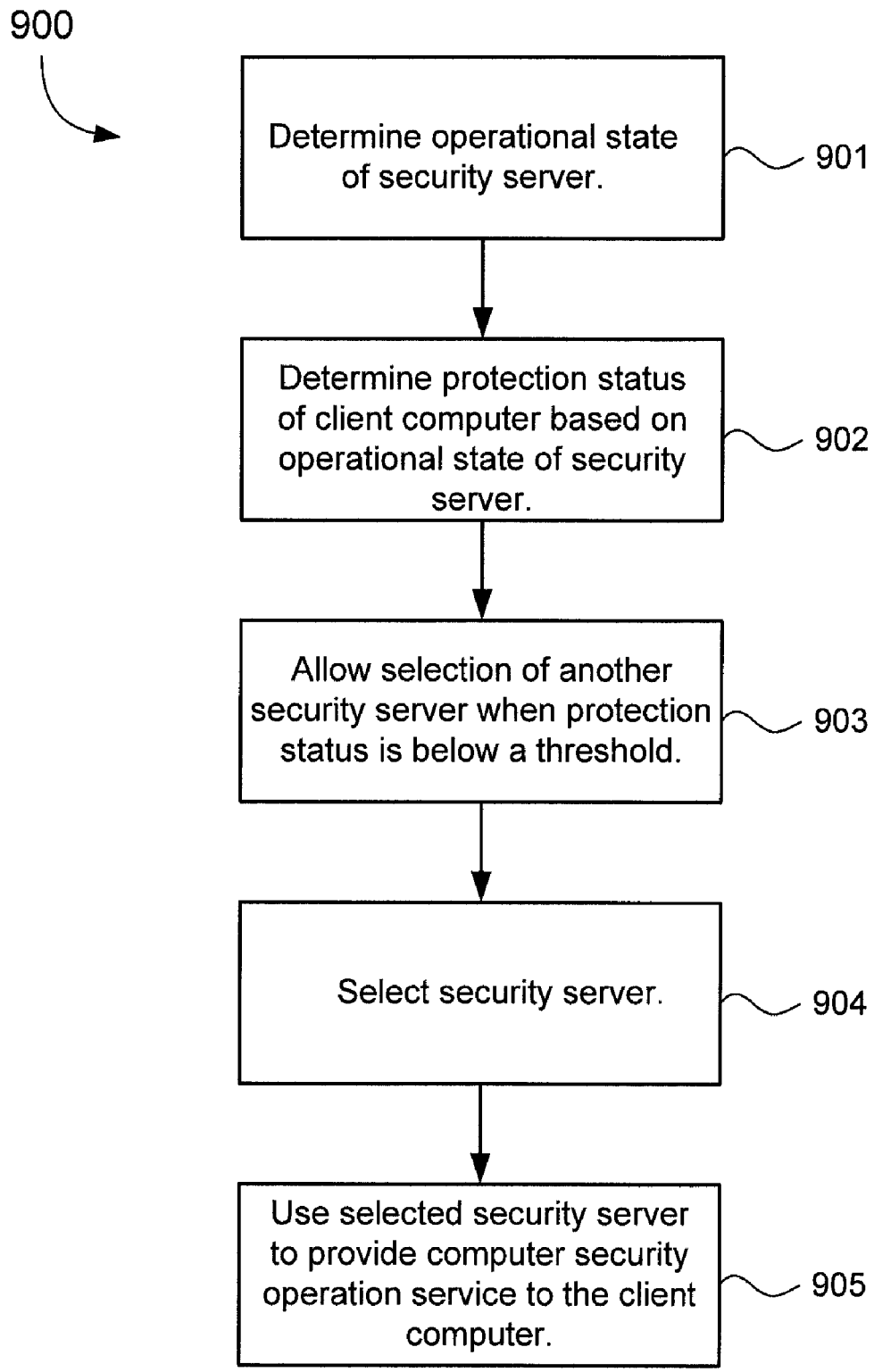
FIG. 9 shows a flow diagram of a method of selecting remotely located security server computers for use by a client computer for computer security operations in accordance with an embodiment of the present invention The use of the same reference label in different drawings indicates the same or like components.

Referring now to FIG. 9, there is shown a flow diagram of a method 900 of selecting remotely located security server computers for use by a client computer for computer security operations in accordance with an embodiment of the present invention. The method 900 is explained using previously described components for illustration purposes only. Other components may also be used without detracting from the merits of the present invention.

In the example of FIG. 9, the distribution module 130 running on the client computer 100 determines the operational state of one or more security server computers 210 (step 901). The distribution module 130 may determine the operational state of a security server computer 210 by determining the available bandwidth for network communication between the client computer 100 and the security server computer 210. The distribution module 130 may determine the protection status of the client computer 100 based on the operational state of the currently selected security server computer 210 (step 902). The distribution module 130 may allow for selection of another security server computer 210 when the protection status of the client computer 100 due to use of currently selected security server computer 210 is below a threshold (step 903). The distribution module 130 may allow for selection of another security server computer 210 (step 904) manually or automatically. For example, the distribution module 130 may display to the user a listing of available security server computers 210 and the protection status that will result from their selection. This allows the user to manually select another security server computer 210 that provides the highest level of protection status. As another example, the distribution module 130 may automatically select a security server computer 210 that provides the highest level of protection status to the client computer 100 when the currently selected security server computer 210 provides a low level protection status. The client computer 100 may use the selected security server computer 210 to provide computer security operation service to the client computer (step 905).

Methods and apparatus for selecting a remote security server for computer security operations have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of selecting a remotely located security server computer for computer security operation, the method to be performed by a client computer and comprising:
   determining an available bandwidth for network communication between the client computer and a first security server computer in a plurality of security server computers available to provide remote scanning service to the client computer, the first security server computer being selected to provide the remote scanning service to the client computer;
   determining protection status of the client computer based on the available bandwidth for network communication between the client computer and the first security server computer, the protection status having one of at least four different possible levels, each of the levels being indicative of vulnerability of the client computer to malicious codes;
   allowing selection of a second security server computer in the plurality of security server computers to replace the first security server computer when the protection status of the client computer is below a threshold level; and
   using the second security server computer to scan a file of the client computer for malicious codes.

2. The method of claim 1 wherein determining the available bandwidth for network communication between the client computer and the first security server computer comprises:

transmitting probing packets from the client computer to the first security server computer;

receiving an acknowledgement packet from the security server computer that the security server computer received the probing packets; and determining the time between transmitting the probing packets to the security server computer and receiving the acknowledgement packet in the client computer.

3. The method of claim 1 wherein allowing selection of the second security server computer comprises:

displaying a user interface on a display monitor of the client computer, the user interface including a listing of security server computers in the plurality of security server computers along with a protection status resulting from selection of the listed security server computers; and allowing a user of the client computer to manually select one of the listed security server computers.

4. The method of claim 3 wherein the user interface includes a graphical icon indicating a current protection status of the client computer.

5. The method of claim 3 wherein the user interface further includes a component that may be activated by a user of the client computer to view the listing of security server computers.

6. The method of claim 3 wherein the user interface comprises a pop-up display.

7. The method of claim 1 wherein allowing selection of the second security server computer comprises:

determining available bandwidth for network communication between each of the plurality of security server computers and the client computer; and automatically selecting the second security server computer, wherein available bandwidth for network communication between the second security server computer and the client computer is more than available bandwidth between a third security server computer and the client computer, the third security server computer being one of the plurality of security server computers.

8. A client computer comprising:

a computer security module comprising computer-readable program code running in memory of the client computer, the computer security module being configured to perform a computer security operation in the client computer; and an active content distribution module comprising computer-readable program code running in the memory of the client computer, the active content distribution module being configured to select one of a plurality of security server computers available for use by the computer security module to perform the computer security operation based on available bandwidth for network communication between the client computer and the plurality of security server computers, the active content distribution module being configured to allow selection of one of the plurality of security server computers when a currently selected security server computer being used by the computer security module to perform the computer security operation results in the client computer having a protection status indicating the client computer is vulnerable to malicious codes or online threats, the protection status having one of at least four possible levels.

9. The client computer of claim 8 wherein the active content distribution module is configured to replace the currently selected security server computer with another security server computer having available bandwidth for network communication that results in the protection status meeting a minimum threshold level.

10. The client computer of claim 8 wherein the active content distribution module is configured to display a user interface that displays a listing of the plurality of security server computers along with protection status resulting from selection of the plurality of security server computers.

11. The client computer of claim 8 wherein the active content distribution module is configured to display a user interface with a graphical icon of the protection status.

12. The client computer of claim 8 wherein the computer security operation comprises scanning of a file of the client computer for malicious codes.

13. The client computer of claim 12 wherein the client computer is configured to provide the file to the currently selected security server computer where the file is scanned for malicious codes and to receive in the client computer a result of scanning the file for malicious codes.

14. The client computer claim 8 wherein the computer security operation comprises detecting spam e-mail.

15. The client computer of claim 8 wherein the computer security operation comprises detecting malicious websites.

16. A method of selecting a remotely located server for computer security operation, the method to be performed by a client computer and comprising:

determining an operational state of each of a plurality of server computers configured to provide a computer security operation service to the client computer;

determining a protection status of the client computer for each of the plurality of server computers; and allowing selection of a second server computer in the plurality of server computers when the protection status of the client computer is below a minimum level due to use of a first server computer currently being used by the client computer to provide the computer security operation service to the client computer.

17. The method of claim 16 wherein allowing selection of the second server computer comprises:

displaying a user interface on a display monitor of the client computer, the user interface including a listing of the plurality of security server computers along with resulting protection status; and allowing a user of the client computer to manually select one of the plurality of server computers.

18. The method of claim 16 wherein allowing selection of the second server computer comprises:

automatically selecting the second server computer based on available bandwidth for network communication between the second server computer and the client computer, wherein the available bandwidth for network communication between the second server computer and the client computer is more than available bandwidth between a third server computer and the client computer, the third server computer being one of the plurality of server computers.

19. The method of claim 16 wherein the computer security operation service is for malicious code scanning.

20. The method of claim 16 wherein determining the operational state of each of the plurality of server computers comprises determining available bandwidth for network communication between each of the plurality of server computers and the client computer.

* * * * *